United States Patent
Ressler (10) Patent No.: US 10,251,232 B1
(45) Date of Patent: Apr. 2, 2019

(54) DYNAMIC LIGHT DISPLAY

(71) Applicant: COGNICOLOR, LLC, Seattle, WA (US)

(72) Inventor: Bryan Kent Ressler, Seattle, WA (US)

(73) Assignee: COGNICOLOR, LLC, Spokane, WA (US)

( * ) Notice: Subject to any disclaimer, the term of this patent is extended or adjusted under 35 U.S.C. 154(b) by 0 days.

(21) Appl. No.: 16/048,734

(22) Filed: Jul. 30, 2018

Related U.S. Application Data (60) Provisional application No. 62/539,388, filed on Jul. 31, 2017.

(51) Int. Cl.
*F21V 3/02* (2006.01)
*H04R 1/02* (2006.01)
*H05B 37/02* (2006.01)
*G09G 3/30* (2006.01)
*G06F 3/038* (2013.01)
*H05B 33/08* (2006.01)
*F21V 11/00* (2015.01)
*F21Y 113/13* (2016.01)
*F21Y 107/30* (2016.01)
*F21Y 115/10* (2016.01)

(52) U.S. Cl.
CPC .......... *H05B 33/0854* (2013.01); *F21V 3/02* (2013.01); *F21V 11/00* (2013.01); *H04R 1/028* (2013.01); *H05B 37/0227* (2013.01); *H05B 37/0272* (2013.01); *F21Y 2107/30* (2016.08); *F21Y 2113/13* (2016.08); *F21Y 2115/10* (2016.08)

(58) Field of Classification Search
CPC ......... G09G 2300/0842; G09G 3/3233; G09G 2320/043; G09G 2300/0861; G09G 2300/0819; G09G 2320/0233; G09G 3/3688; G09G 3/3648; G09G 2330/021; G09G 2310/027; G09G 5/006; G09G 2300/0426; G09G 2300/0809; G09G 2360/144; G09G 2320/0626; G09G 3/20; G09G 3/3406; G06F 3/016; G06F 3/011; G06F 3/038; G06F 3/03543; G06F 3/0338

See application file for complete search history.

(56) References Cited

U.S. PATENT DOCUMENTS

2007/0139352 A1* 6/2007 Pugh ................. G02F 1/133514
  345/102
2017/0164434 A1* 6/2017 Xiong ..................... F21V 3/061

OTHER PUBLICATIONS

Wikipedia, "Lava lamp", Internet article available at https://en.wikipedia.org/wiki/Lava_lamp, accessed Oct. 29, 2018.

* cited by examiner

*Primary Examiner* — Minh D A
(74) *Attorney, Agent, or Firm* — Nathaniel A. Gilder; Jensen & Puntigam, PS (57) ABSTRACT

A dynamic light display may include an array of lighting elements behind a translucent material. The array of lighting elements may be controlled by an electronic controller which controls activation and deactivation as well as intensity levels of the individual lighting elements of the array. The electronic controller may generate dynamically moving light shapes which move around on the array. The dynamically moving light shapes are diffused through the translucent material to produce dynamic light display sequences, which may serve a wide range of applications.

19 Claims, 5 Drawing Sheets

DYNAMIC LIGHT DISPLAY

CROSS-REFERENCE TO RELATED APPLICATION

The present application is a nonprovisional claiming priority under 35 U.S.C. § 119 of U.S. Provisional Application 62/539,388, entitled "Dynamic Light Display", filed on Jul. 31, 2017, the entire contents of which are incorporated herein by reference.

BACKGROUND

Electronic lighting technologies have continued to evolve, and as they evolve, they find new and useful applications in our daily lives. For example, Light Emitting Diode (LED) technology has improved significantly over the past several decades, resulting in its widespread adoption in light bulbs, television displays, vehicle headlights, and many other applications. There is an ongoing need for improved electronic lighting technologies, and for new applications of such technologies as they emerge.

SUMMARY

A dynamic light display and a variety of related technologies are disclosed herein. The disclosed dynamic light display may include a translucent case, a controllable LED array disposed inside the translucent case, and a dynamic light display controller electronically coupled to the controllable LED array. The controllable LED array may comprise a plurality of individual LED elements, each individual LED element comprising at least one LED subpixel and a local controller. Each individual LED element may optionally further comprise a plurality of individually controllable LED subpixels. The dynamic light display controller may be configured to send control signals to the controllable LED array. The control signals may be received at the LED elements of the controllable LED array, and the control signals include intensity levels for LED elements, or subpixels thereof, associated with each LED element of the controllable LED array. The local controllers at each LED element may receive the intensity levels and apply the intensity levels at the LED subpixels. The dynamic light display controller may be configured to send the control signals in order to dynamically modify the intensity levels of the LED elements, or subpixels thereof, in the controllable LED array. Further aspects and embodiments are described in detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

In general, this disclosure provides a dynamic light display which may include an array of lighting elements behind a translucent material. The array of lighting elements may be controlled by an electronic controller, referred to herein as a dynamic light display controller, which controls activation and deactivation as well as intensity levels of the individual lighting elements of the array. The dynamic light display controller may generate dynamically moving light shapes which move around on the array. The dynamically moving light shapes are diffused through the translucent material to produce dynamic light display sequences, which may serve a wide range of applications.

Figure 1:
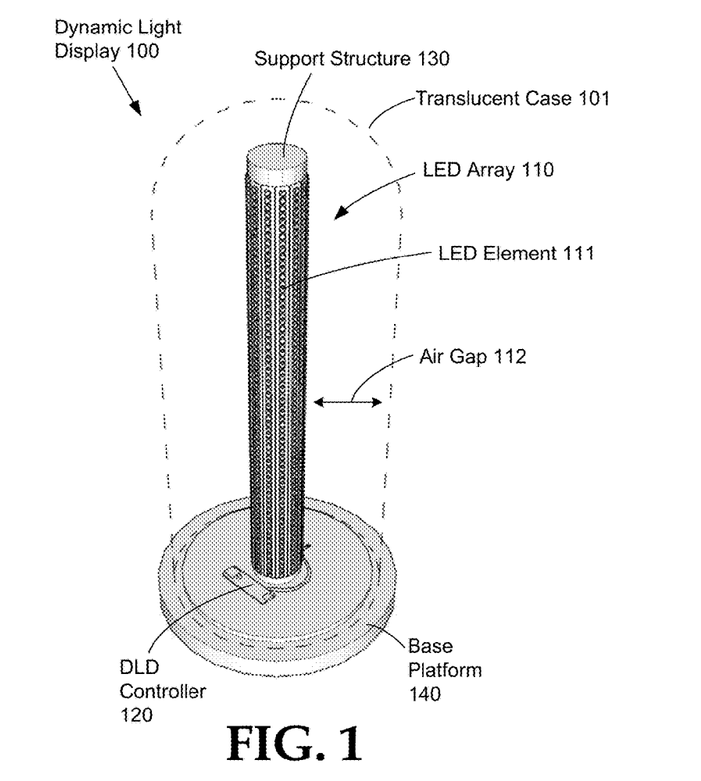
FIG. 1 provides a perspective view of an interior of an example dynamic light display.

FIG. 1 provides a perspective view of an interior of an example dynamic light display, in accordance with at least some embodiments of this disclosure. FIG. 1 illustrates dynamic light display 100. Dynamic light display 100 is in a tower configuration comprising a base platform 140 and a support structure 130 extending upward from the base platform 140. Support structure 130 supports an LED array 110 comprising a plurality of LED elements 111. LED array 110 is coupled with a dynamic light display (DLD) controller 120. The support structure 130, LED array 110, and DLD controller 120 are covered by a translucent case 101, which extends over the support structure 130 and down to the base platform 140. An air gap 112 separates the LED array 110 and the translucent case 101.

The dynamic light display 100 is illustrated in a cylindrical tower configuration with a dome top. In the illustrated configuration, the translucent case 101, support structure 130, and LED array 110 are each at least partially cylindrical. Translucent case 101 comprises a cylindrical sidewall with a dome top. The translucent case 101 fits over the support structure 130 and extends to the base platform 140 to completely enclose the support structure 130 and LED array 110. The translucent case 101 and the support structure 130 are sized to leave a cylindrical air gap 112 between the translucent case 101 and the exterior surface of the support structure 130.

Furthermore, in the illustrated cylindrical tower configuration, cylindrical support structure 130 comprises a rigid cylinder extending from the base platform 140. The controllable LED array 110 comprises a plurality of LED columns affixed to an exterior surface of the cylindrical support structure 130. The plurality of LED columns may be electronically coupled in series, in parallel, or otherwise.

Other configurations are also possible, as will be appreciated. For example, a hanging configuration may comprise a cylindrical case with a domed top and a domed bottom, thereby omitting the base platform 140. A hanging sphere may comprise a spherical case and round support structure in the middle thereof. The controller 120 may be disposed inside the support structure, e.g., in embodiments which do not include a base platform. Furthermore, in some embodiments, the support structure may have flat sides which may optionally spiral as the support structure extends upwards. In some embodiments, the plurality of LED columns may spiral around the support structure. A wide variety of other configurations are possible as will be appreciated.

The dynamic light display 100 may be made of any suitable components and materials. For example, in some embodiments, the base platform 140 and support structure 130 may be made of metal, wood, or plastic. The LED array 110 may comprise, e.g., white strips of APA102 type LEDs. The DLD controller 120 may comprise, e.g., a Freescale MK66FX1M0VMD18 ARM Cortex M4F-type controller, configured as disclosed herein, with, for example, a JST-SM connector to connect with LED array 110. Those of skill in the art will appreciate that a wide variety of comparable controllers and/or other controller types as well as a variety of wiring and/or connector types may be used in some embodiments.

The translucent case 101 may be made of glass, acrylic, a polymer such as styrene or polyethylene, or any other translucent material. Example acrylic cases may be made using a textured mold, e.g., a mold that has been sand or bead blasted, which produces a translucent surface texture. In some embodiments, glass or acrylic cases may also be sand or bead blasted, or sprayed, e.g., with paint or Teflon spray, to produce a translucent surface texture. In still other embodiments, glass, acrylic or other clear material composing translucent case 101 could also be made translucent through the application of an interlayer of diffusing material—i.e., a lamination—or a surface application of such a material to the inside or outside of the translucent case 101.

The dynamic light display 100 may be made in a wide range of different sizes. In some embodiments, the dynamic light display 100 may be about 0.5 meters (m) to 2 meters tall, and about 20 centimeters (cm) to 0.5 m in diameter. The air gap 112 may be about 2 cm-25 cm. Of course, a wide variety of other sizes may be made by those of skill in the art and this disclosure is not limited to any particular sizes. The air gap 112 may, in some embodiments, contain gases other than or in addition to air having been temporarily introduced into air gap 112 or persistently sealed therein for purposes of enhancing and augmenting the dynamic light display 100. For example, theatrical smoke or fog may be introduced to enhance the diffusion effect of translucent case 101. In some embodiments, a clear case may be substituted for translucent case 101, and translucent gasses in air gap 112 may provide the desired translucent effect.

Figure 2:
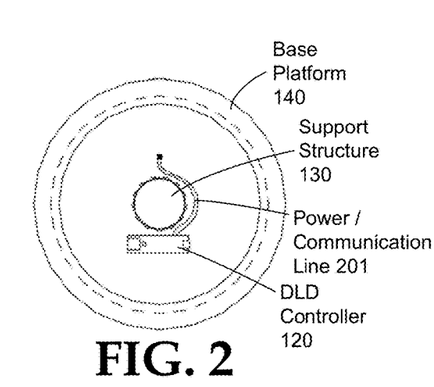
FIG. 2 provides a top plan view of the example dynamic light display.
Figure 6:
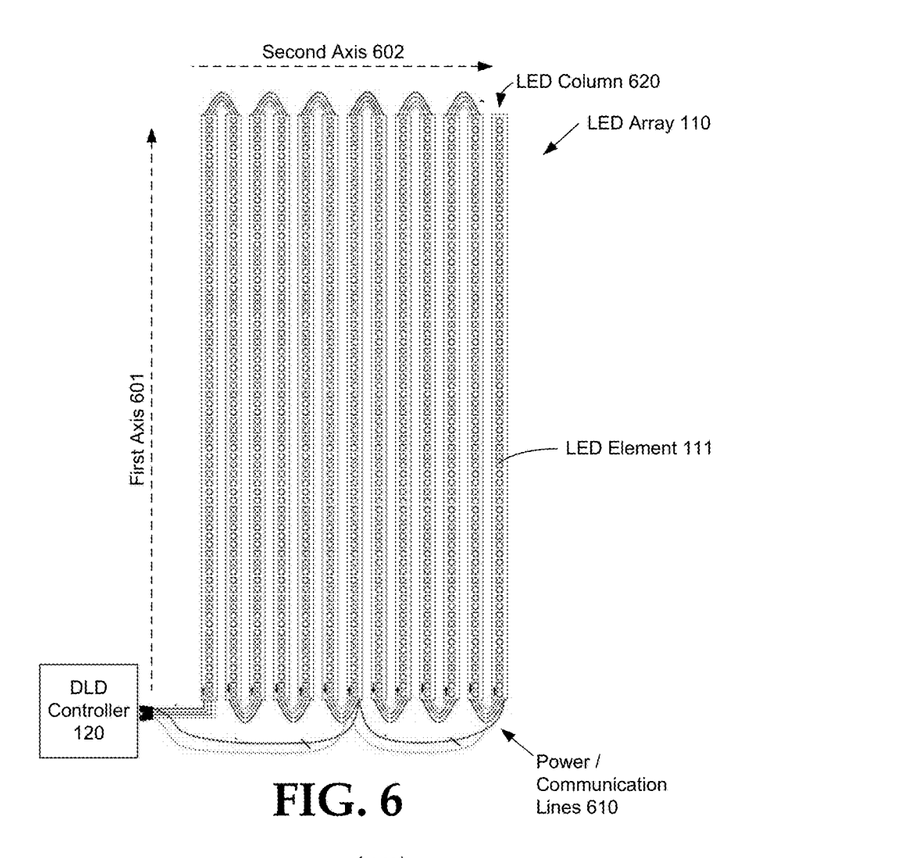
FIG. 6 illustrates an example dynamic light display controller and LED array for a dynamic light display.

FIG. 2 provides a top plan view of the example dynamic light display 100, in accordance with at least some embodiments of this disclosure. FIG. 2 illustrates base platform 140 and support structure 130 as seen from the top. FIG. 2 furthermore includes a top view of DLD controller 120. A power/communication line 201 extends from DLD controller 120 to a hole in the base platform 140. Although not visible in FIG. 2, further power/communication lines may extend between DLD controller 120 and LED array 110, as illustrated in FIG. 6. A dotted line shows a rim of translucent case 101 fitting over a ridge in the base platform 140.

Figure 3:
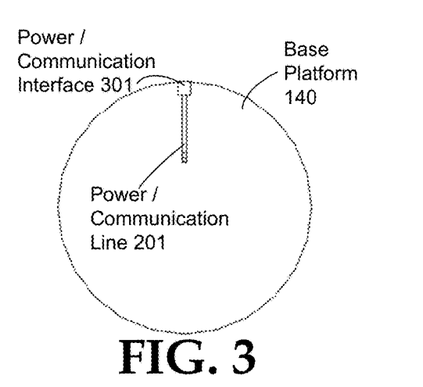
FIG. 3 provides a bottom plan view of the example dynamic light display.

FIG. 3 provides a bottom plan view of the example dynamic light display 100, in accordance with at least some embodiments of this disclosure. FIG. 3 illustrates base platform 140 as seen from the bottom. Power/communication line 201 emerges from the hole in base platform 140 and extends to a power/communication interface 301. Power/communication interface 301 may comprise, e.g., a Universal Serial Bus (USB) interface, or any of a wide variety of other interface types, as known in the art or as may be developed.

Figure 4:
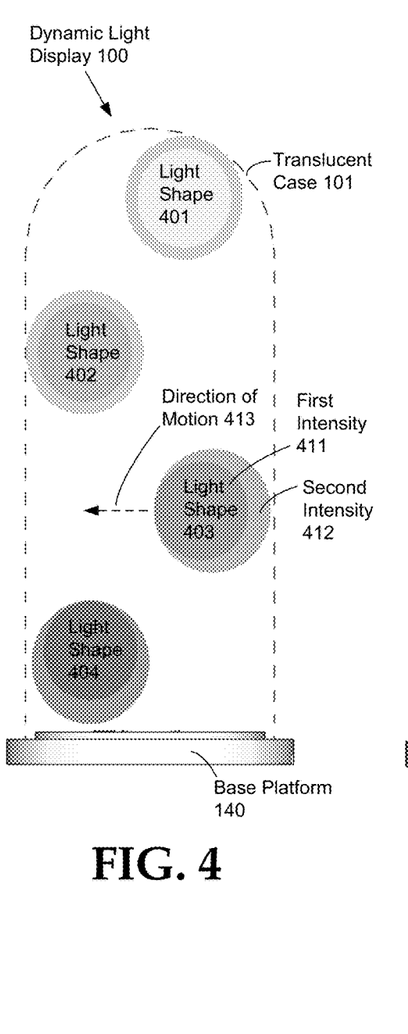
FIG. 4 provides a side elevation view of an exterior of the example dynamic light display, during operation thereof.

FIG. 4 provides a side elevation view of an exterior of the example dynamic light display 100, during operation thereof, in accordance with at least some embodiments of this disclosure. FIG. 4 illustrates base platform 140 and translucent case 101. A plurality of light shapes 401, 402, 403, and 404 appear through the translucent case 101. Four light shapes are illustrated in FIG. 4, however more or fewer light shapes may be produced by dynamic light display 100, as will be appreciated. The light shapes 401, 402, 403, and 404 may include regions of differing intensity, e.g., first intensity 411 and second intensity 412. Furthermore, the light shapes 401, 402, 403, and 404 may move in any direction, e.g., light shape 403 is illustrated as having a direction of motion 413. Control of the various light shapes 401, 402, 403, and 404, including control of the shape, intensity, motion and color thereof, is described further in connection with FIG. 8.

Figure 5:
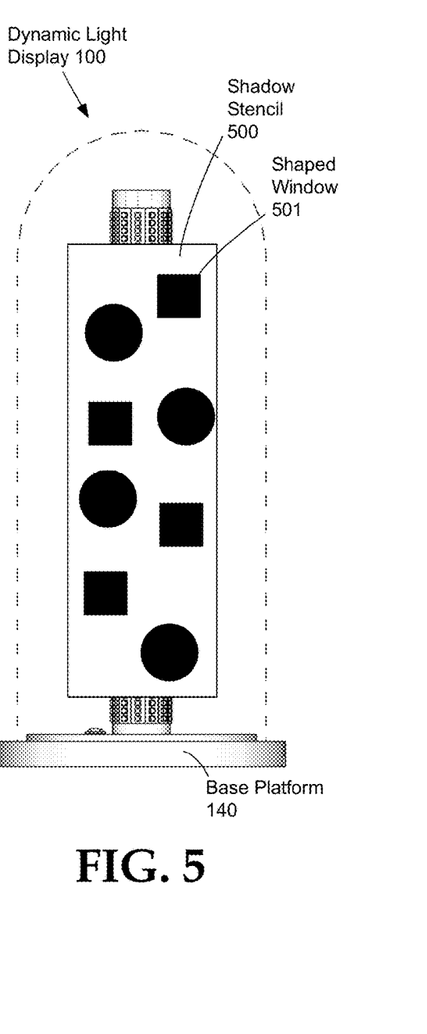
FIG. 5 provides a side elevation view of an interior of the example dynamic light display, fitted with a shadow stencil.

FIG. 5 provides a side elevation view of an interior of the example dynamic light display 100, fitted with a shadow stencil, in accordance with at least some embodiments of this disclosure. FIG. 5 illustrates base platform 140, translucent case 101, and portions of LED array 110. A shadow stencil 500 is positioned between LED array 110 and translucent case 101. The shadow stencil 500 includes a plurality of shaped windows 501, which serve to cast shaped shadows and/or modified light shapes 401, 402, 403, 404 onto translucent case 101 during operation of the dynamic light display 100.

Shadow stencil 500 provides one example approach to casting shaped shadows and/or modified light shapes 401, 402, 403, 404 onto translucent case 101. Other approaches may include, for example, placing any materials inside air gap 112. Branches, leaves, moss, pinned insects, etc., may be positioned in air gap 112 to "seasonalize" or otherwise decorate the dynamic display unit, e.g., for seasonal or holiday themes.

FIG. 6 illustrates an example controller and LED array for a dynamic light display, in accordance with at least some embodiments of this disclosure. FIG. 6 illustrates DLD controller 120 and LED array 110. The LED array 110 comprises a plurality of LED columns 620, each LED column 620 comprising a plurality of individual LED elements 111. The DLD controller 120 and the LED columns 620 may be connected in series, in parallel, or otherwise via power/communication lines 610. For example, in some embodiments, clock and data lines included in power/communication lines 610 may couple the LED columns 620 in series, while power lines included in power/communication lines 610 may couple the LED columns 620 in parallel. The LED array 110 is shown as having a first axis 601 and a second axis 602. The LED array 110 may be wrapped around the support structure 130, in order to shape the LED array 110 in a desired shape, such as a cylinder.

LED array 110 may have a first resolution of LED elements 111 along first axis 601, and a second resolution of LED elements 110 along second axis 602. Different embodiments may have different resolutions as may be desired. In some embodiments, the first resolution along first axis 601 may include at least 100 individual LED elements 111 per meter, and the second resolution individual LED elements 111 along second axis 602 may include at least 50 individual LED elements 111 per meter.

Figure 7:
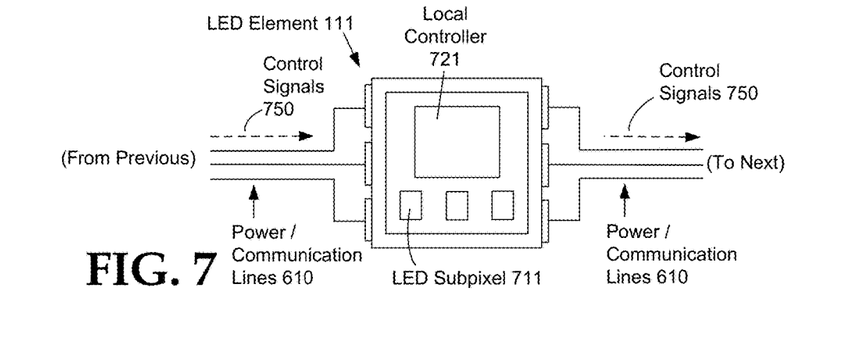
FIG. 7 illustrates an example LED element for an LED array.

FIG. 7 illustrates an example LED element for an LED array, in accordance with at least some embodiments of this disclosure. LED element 111 includes a local controller 721 and a plurality of LED subpixels 711. Power/communications lines 610 may bring electrical power and control signals 750 from a previous element to LED element 111, and power/communications lines 610 may bring electrical power and control signals 750 from LED element 111 to a next element.

LED subpixels 711 may comprise, e.g., individually controllable and differently colored LED subpixels, e.g., Red, Blue, and Green. Local controller 721 may activate any LED subpixels 711, at any desired intensity levels, as instructed by control signals 750. By activating different LED subpixels 711 at different intensities, control signals 750 may cause LED element 111 to produce any of a wide range of colors, at any of a wide range of intensities. Furthermore, control signals 750 may cause LED element 111 to modify its output color and intensity by changing the output intensities of the different LED subpixels 711.

The rate at which control signals 750 cause LED element 111 to modify color or intensity is referred to herein as frame rate, which may be expressed as frames per second or FPS. For example, a frame rate of 25 FPS includes 25 control signals 750 per second, each control signal optionally changing the output intensities of LED subpixels 711. The control signals 750 are generated at DLD controller 120, as described further in connection with FIG. 8.

Figure 8:
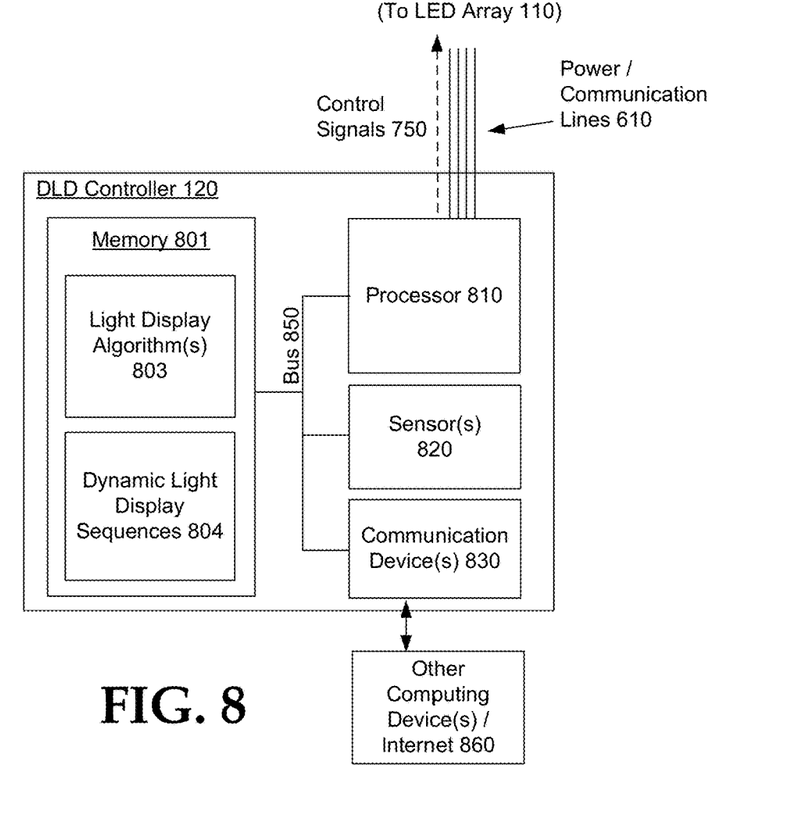
FIG. 8 illustrates an example dynamic light display controller.

FIG. 8 illustrates an example DLD controller for a dynamic light display, in accordance with at least some embodiments of this disclosure. DLD controller 120 may include a processor 810 and a memory 801. Memory 801 may include any of a wide range of memory technologies, e.g., Random Access Memory (RAM) and/or Read Only Memory (ROM). Other optional forms for memory 801 include on-chip EEPROM, non-volatile NAND Flash memory that may be built into a microcontroller chip, and removable NAND Flash storage, e.g., in the form of a Micro SD card.

Memory 801 may include light display algorithm(s) 803 and dynamic light display sequences 804. DLD controller 120 may furthermore include one or more sensor(s) 820 and communication device(s) 830. Processor 810 may process light display algorithm(s) 803 and dynamic light display sequences 804 to generate control signals 750 to send to LED array 110, via power/communication lines 610. In some embodiments, communication device(s) 830 may communicate with other computing devices/internet 860, e.g., to retrieve dynamic light display sequences 804 and/or to receive control instructions for activating, deactivating, and operating the dynamic light display 100.

DLD controller 120 may be electronically coupled to the controllable LED array 110 via power/communication lines 610. Processor 810 may process light display algorithm(s) 803, e.g., by loading and executing software instructions associated with light display algorithm(s) 803. Light display algorithm(s) 803 may direct processor 810 to, e.g., a particular dynamic light display sequence among dynamic light display sequences 804. A dynamic light display sequence may comprise, e.g., a choreography of light patterns for display by the dynamic light display 100, including light shapes, light colors, light intensities, and light movements, for display over a period of time. For example, a dynamic light display sequence may comprise a plurality of light shapes of different sizes, shapes, color, intensity and/or motion, which may optionally be displayed simultaneously and may change over time. Processor 810, configured by light display algorithm(s) 803, may process dynamic light display sequences 804 in order to generate corresponding control signals 750. The controller 120 may thereby generate and send control signals 750 to the controllable LED array 110, thereby generating choreographed lighting displays as specified in the dynamic light display sequences 804.

In some embodiments, light display algorithm(s) 803 may generally include features such as set forth in the below pseudocode:

```
function setup:
    colorPalette[13] = colors.chooseRandom( )   # choose random colors for each LED column
    for (i = 0; i < 13; i++)
        spots[i].color = colorPalette[i]              # set spotlight color
        spots[i].location = random(0, 1)              # set spotlight position from 0 to 1
        spots[i].delta = random(0.05, 0.3)            # set spotlight motion speed
function animate:
    finishTime = now( ) + 10000                       # calculate an animation stop time
    msPerFrame = 1000/50                              # calculate milliseconds per frame
    while (now( ) < finishTime)
        for (i = 0; i < 13; i++)
            spots[i].position += spots[i].delta;  # move spotlight
        sendSpotlightsToLEDs( )
        delay(msPerFrame);
```

In the above example, an LED array may include 13 columns of LEDs. The example algorithm moves sprites (light shapes) up and down each vertical column independently. A spotlight may comprise, e.g., a movable Gaussian light shape with a color, width, location, and (in this example) a velocity in the form of delta-position.

In some embodiments, dynamic light display sequences 804 may generally include features such as set forth in the below example data structure:

```
structure RGB
    byte red                        # red subpixel intensity
    byte green                      # green subpixel intensity
    byte blue                       # blue subpixel intensity
structure Animation
    int numLEDs                             # count of LEDs in embodiment
    int numFmmes                            # count of animation frames
    RGB[numLEDs * numFrames]                # animation frames
```

In some embodiments, the LED elements 111 in LED array 110 may be in sequence, with data and clock lines among the power/communication lines 610 that run between LED elements 111. The DLD controller 120 may send clock and data to the first LED element 111, and as long as data continues coming in from controller 120, the first LED element 111 may continue passing data along to the next LED element 111, and that next LED element 111 may pass data to the next LED element 111, and so on. Each LED element 111 remembers the last 32 bits (or other amount) of data that came into it. So the LED elements 111 may operate as a shift register, as that term is used in electronics. When a new bit comes in at the first LED element 111, all the bits move over towards the last LED element 111.

DLD controller 120 may send control signals 750, comprising a plurality of frames, to the controllable LED array 110. For each frame, DLD controller 120 may calculate the color of every LED element 111, and DLD controller 120 may store the resulting output in a list, e.g., a list including 3 bytes (or other amount) of color information per LED element 111. Then when it is time to clock out the next frame, DLD controller 120 may write all that data out to LED array 110. DLD controller 120 may also send to LED array 110 a "trailer" that tells the LED elements 111 to "latch", meaning, show the color they have in their local controllers 721.

After latching, LED elements 111 may remain the color at which they latched, without DLD controller 120 sending any new data. LED elements 111 may remain a color until they get new color data, and a new latch signal, from DLD controller 120. For example, at a frame rate of 50 frames per second, LED elements 111 may remain a color for 20 milliseconds, until the next color data and latch signal arrive. In this manner, each and every LED element 111 may be individually controlled, by sending frames of data including color and intensity for all LED elements 111 in the LED array 110. The control signals 750 include intensity levels for each of the individual LED elements 111 of the controllable LED array 110, and the local controllers 721 receive the intensity levels within the control signals 750 and apply the intensity levels at the LED subpixels 711.

In some alternative embodiments, LED elements 111 may be uniquely addressable, e.g., similar to devices in an Internet Protocol (IP) network such as a Local Area Network (LAN). DLD controller 120 may be configured to communicate with each LED element 111 individually. Control signals 750 may include addresses for local controllers of the individual LED elements 111 in the LED array 110, along with intensity levels for individual LED elements 111 of the controllable LED array 110. In embodiments comprising LED subpixels, control signals 750 may include intensity levels for LED subpixels 711 associated with each local controller 721 of the controllable LED array 110. The DLD controller 120 may be configured (by light display algorithm(s) 803) to send the control signals 750 in order to dynamically modify the intensity levels of the LED subpixels 711 in the controllable LED array 110. By dynamically modifying the intensity levels of the LED subpixels 711 in the controllable LED array 110, DLD controller 120 may control the aggregate color output of each of LED elements 111.

DLD controller 120 may send control signals 750 at any desired frame rate. For example, in some embodiments, the DLD controller 120 may be configured to send the control signals 750 at a frame rate of 25-75 frames per second. Faster or slower frame rates are also possible, e.g., in some embodiments, and for audio visualization in which sounds are converted to light displays in particular, a frame rate of 90 frames per second or higher may be advantageous. In some embodiments, each frame may comprise a control signal for each LED element 111 in the controllable LED array 110, instructing each LED element 111 regarding intensity levels, e.g., for intensity levels for each of the LED subpixels 711 in a corresponding LED element 111. Faster frame rates will generally produce smoother color transitions and motions of light shapes 401, 402, 403 and 404, while slower frame rates will generally produce more "flicker" in color transitions and motions of light shapes 401, 402, 403 and 404. A frame rate of about 50 frames per second may produce sufficiently smooth effects for many embodiments.

In some embodiments, light display algorithm(s) 803 may configure DLD controller 120 to dynamically modify the intensity levels of the LED subpixels 711 in the controllable LED array 110 to produce one or more moving light shapes 401, 402, 403, 404. Moving light shapes 401, 402, 403, 404 may be produced, e.g., by progressively activating LED elements 111 proximal to one edge of a light shape, while progressively deactivating LED elements 111 proximal to an opposite edge of the light shape, thereby causing the light shape to "move" across the LED array 110. Light shapes may also change shape, color, and/or intensity as they move, under the direction of the DLD controller 120.

In some embodiments, light display algorithm(s) 803 may configure DLD controller 120 to adjust intensity of LED elements 111, or LED subpixels 711 thereof, within a given light shape 401, 402, 403, or 404, in order to produce different intensity regions within the light shape, e.g., first intensity 411 and second intensity 412, as illustrated in FIG. 4. For example, a light shape 403 may have a brighter region of high intensity in a middle region of the light shape 403, and a dimmer region of lower intensity in a perimeter region of the light shape 403. Similarly, a light shape 403 may have regions of different colors.

In some embodiments, light display algorithm(s) 803 may configure DLD controller 120 to adjust the intensity levels of the LED subpixels 711 in the controllable LED array 110 to produce a Gaussian intensity reduction at one or more edges of a moving light shape such as 401, 402, 403, or 404. A Gaussian intensity reduction is one example of a smooth and continuous type intensity reduction, and other approaches to intensity reduction may be applied in some embodiments. For a moving light shape, DLD controller 120 may dynamically modify the intensity levels of the LED subpixels 711 in order to move the light shape, along with the Gaussian intensity differences therein, across the LED array 110.

In some embodiments, light display algorithm(s) 803 may configure DLD controller 120 to adjust the intensity levels of the LED subpixels 711 in the controllable LED array 110 in a manner that produces visual movement of different light intensities and/or colors without necessarily producing discrete light shapes such as 401, 402, 403, or 404. For example light display algorithm(s) 803 may generally include a spatial noise algorithm such as set forth in the below pseudocode:

```
function setup:
    Bitmap bm = new Bitmap(13, 66)                              # thirteen columns of sixty-six LEDs
    SimplexNoise sn = new SimplexNoise(3) # initialize Simplectic noise generator for 3 dimensions
    ColorGradient grad = ColorGradient.createCoordinatedRandom( )          # create a subjectively-
attractive gradient
    xScale = random(0.005, 0.1)                    # pick bounded random x-scale for noise field
    yScale = random(0.005, 0.1)                    # pick bounded random y-scale for noise field
    zScale = random(0.005, 0.1)                    # pick bounded random z-scale (time) for noise field
function animate:
    startTime = now( )                             # not current time in milliseconds
    finishTime = startTime + 10000                 # calculate an animation stop time
    msPerFrame = 1000/50                           # calculate milliseconds per frame
    while (now( ) < finishTime)
        normTime = (now( ) - startTime)/10000              # calculate normalized time 0-1
        sn.sampleNoiseField(bm, xScale, yScale, zScale * normTime)             # calculate grayscale
noise field into bitmap
        bm.applyColorGradient(grad)                # recolor grayscale using color gradient
        sendBitmapToLEDs(bm)                       # display the image on the LED array
        delay(msPerFrame)
```

Generally speaking, algorithms such as the above may perform operations of creating a spatially coherent grayscale noise field, in which pixel grayscale values depend somewhat on values of nearby pixels, and then adding color to the noise field, e.g., by mapping pixel grayscale values through a color gradient.

In some embodiments, DLD controller 120 may comprise one or more sensor(s) 820, as illustrated in FIG. 8. Sensors 820 may include, e.g., an acoustic sensor (microphone), a motion sensor such as an infrared (IR) sensor, or a camera/optical sensor. In some embodiments, sensors 820 may include or be coupled with separate processors, e.g., Digital Signal Processors (DSPs) for processing incoming sounds or signals from a microphone, IR sensor, or camera.

Light display algorithm(s) 803 may configure DLD controller 120 to use sensor 820 inputs to generate the control signals 750. For example, an acoustic input, or other sensor input, may be processed by DLD controller 120 in order to produce corresponding light shape 401, 402, 403, 404 colors, sizes, shapes, motions and intensities at LED array 110. Light display algorithm(s) 803 may for example translate acoustic frequencies into color frequencies, acoustic amplitude into light intensities, and rates of acoustic frequency or amplitude change into light shape motions and accelerations. DLD controller 120 may be configured for similar operations for other sensor inputs. In some embodiments, light display algorithm(s) may interrogate the sensor(s) 820, and use sensor values to modify the light shapes 401, 402, 403, 404 in real time response to the sensor(s) 820, thereby producing real time responses to gestures, sounds, ambient light, or other conditions or events detected by sensor(s) 820. In some embodiments, light display algorithm(s) may incorporate readings from the sensors 820, or instructions from the communications devices 830 into outgoing control signals 750.

In some embodiments, sensors 820 and/or communication devices 830 may be "off board", i.e., positioned at locations different than DLD controller 120, and coupled with DLD controller 120 via wired or wireless communication links. For example, an example ambient light sensor 820 may be mounted at the apex of the translucent case 101, and coupled with DLD controller 120 via a communication link. DLD controller 120 may for example use sensor readings to automatically control overall brightness of the dynamic light display 100, based on the ambient light level in the enclosing room. Those of skill in the art will appreciate that numerous other sensors 820 may be advantageously positioned anywhere on or off of DLD controller 120, as well as on or off of the dynamic light display 100 itself.

In some embodiments, DLD controller 120 may comprise wired or wireless communication device(s) 830, as illustrated in FIG. 8. Communication devices 830 may include, for example, a WiFi communication device, a Bluetooth communication device, an Ethernet communication device, or any other communication device capable of sending or receiving signals to or from other computing devices/Internet 860. In some embodiments, a communication device 830 may include a User Interface for inputting a Local Area Network (LAN) WiFi password. Communication device 830 may present an ad hoc WiFi network, for connecting to surrounding smart phones or other WiFi devices. Dynamic light display 100 may include one or more buttons allowing for, e.g., Bluetooth pairing, turning WiFi on and off, or cycling through dynamic light display sequences 804.

In embodiments comprising communication device(s) 830, DLD controller 120 may be configured to allow control of LED array 110 by another computing device, e.g. a device among other computing devices 860. For example, a smart phone or other computer equipped with an application for interacting with dynamic light display 100 may send wired or wireless lighting display control signals to controller 120, and DLD controller 120 may relay, or process and relay, the received wired or wireless lighting display control signals to LED array 110, by sending control signals 750 as instructed by the smart phone or other device. Communication device(s) 830 may establish a wireless communication link to other computing devices 860, and the DLD controller 120 may be configured to use an input received via the wireless communication link to generate the control signals 750.

In some embodiments, DLD controller 120 may be configured to allow activation/deactivation of dynamic light display 100 from other computing devices 860. For example, DLD controller 120 may optionally be configured to receive a dynamic light display sequence selection (from among dynamic light display sequences 804) from the external computing device, to begin playing the selected dynamic light display sequence responsive to a command from the external computing device, and to stop playing the selected dynamic light display sequence responsive to a command from the external computing device. DLD controller 120 may optionally also respond to fast forward or rewind type commands from the external computing device. Furthermore, in some embodiments, DLD controller 120 may be configured to receive new dynamic light display sequences via communication device(s) 830, and to store received dynamic light display sequences in memory 801, e.g., among dynamic light display sequences 804. For example, a collection of dynamic light display sequences may be available at a server on the internet, and embodiments may allow for selection and retrieval of new dynamic light display sequences, for local storage and/or replay at DLD controller 120. In some embodiments, DLD controller 120 may be coupled with a user interface, such as a touchscreen or keyboard, allowing user selection of dynamic light display sequences at DLD controller 120.

In some embodiments comprising communication device(s) 830, DLD controller 120 may be configured to communicate with one or more remote sensors, which are remote from dynamic light display 100, and DLD controller 120 may use remote sensor inputs as described herein with regard to sensors 820. Remote sensors may include, e.g., outdoor weather sensors, acoustic sensors, biological sensors such as wearable heart rate sensors, or any of a wide variety of other sensors as will be appreciated.

In some embodiments, DLD controller 120 and/or other computing devices 860 may include additional control features such as a timer which accepts user inputs to control when a particular dynamic light display sequence, or series of dynamic light display sequences, is to begin or end. Such features may allow the use of dynamic light display 100 as a night light or alarm clock.

Figure 9:
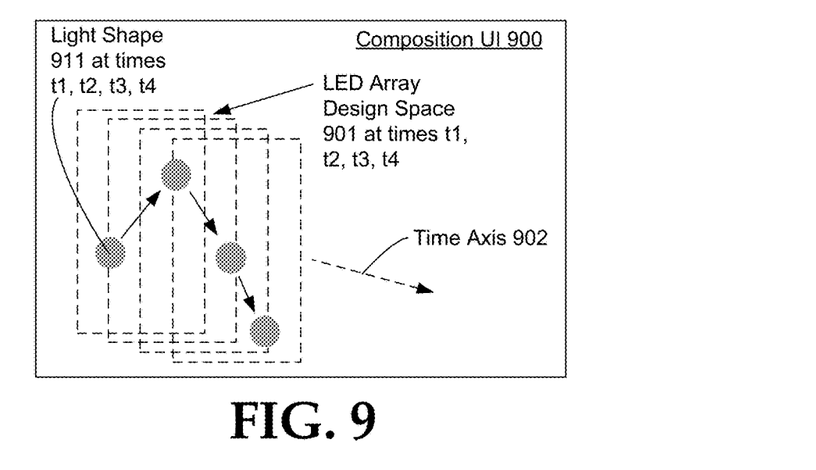
FIG. 9 illustrates an example composition User Interface (UI), as may be implemented at a computing device in order to compose custom dynamic light display sequences for dynamic light displays.

FIG. 9 illustrates an example composition UI, as may be implemented at a computing device in order to compose custom dynamic light display sequences for dynamic light displays, in accordance with at least some embodiments of this disclosure. Composition UI 900 includes an LED array design space 901. LED array design space 901 may include, e.g., multiple frames arranged along a time axis 902, representing states of LED array design space 901 at different times t1, t2, t3, and t4. For example, light shape 911 may be moved to different positions in LED array design space 901 at different times t1, t2, t3, and t4, as shown. The properties of light shape 911 may be set by the user via composition UI 900.

One or more of the other computing devices 860 illustrated in FIG. 8 may be equipped with a composition UI 900. The composition UI 900 may be used to produce/compose custom dynamic light display sequences, which may be sent to DLD controller 120 via communication device(s) 830.

Figure 10:
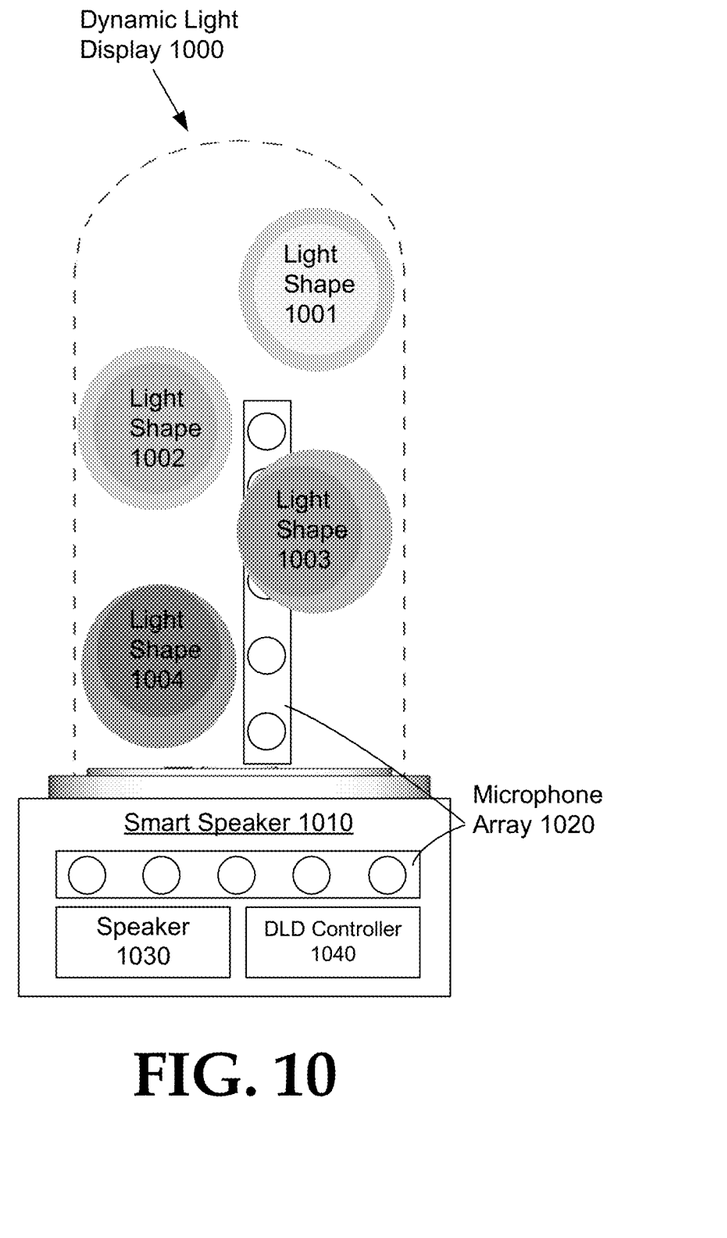
FIG. 10 illustrates an example configuration in which a smart speaker device is coupled with a dynamic light display.

FIG. 10 illustrates an example configuration in which a smart speaker device is coupled with a dynamic light display, in accordance with at least some embodiments of this disclosure. FIG. 10 includes a dynamic light display 1000 coupled with a smart speaker 1010. The dynamic light display 1000 produces one or more moving light shapes 1001, 1002, 1003, and 1004 under the control of the smart speaker 1010. Smart speaker 1010 may include, e.g., microphone array 1020, speaker 1030, and controller 1040.

Dynamic light display 1000 may include any of the elements of dynamic light display 100, wherein such elements may be adapted to couple with and operate in cooperation with smart speaker 1010. In some embodiments, controller 1040 may include the elements of DLD controller 120, along with further elements in order to control both smart speaker 1010 and dynamic light display 1000. In such embodiments, dynamic light display 1000 need not include a separate, redundant DLD controller. In other embodiments, dynamic light display 1000 and smart speaker 1010 may include separate controllers, and smart speaker controller 1040 may control the separate DLD controller for dynamic light display 1000 by sending instructions thereto.

Smart speaker 1010 may comprise, e.g., a product similar to the ECHO® line of devices made by Amazon.com, Inc. of Seattle, Wash., or the GOOGLE HOME® line of devices made by Google Inc. of Mountain View, Calif., or the HOMEPOD® line of devices made by Apple Inc. of Cupertino, Calif., or the INVOKE® line of devices made by Harman International Industries, Inc. a subsidiary of Samsung Electronics Co., Ltd. of Seoul, South Korea. In general, such smart speakers may be adapted to connect to a WiFi network, listen for spoken commands, e.g., by monitoring a microphone, send the commands to a cloud-based personal assistant, and receive and replay information received from the personal assistant. Smart speaker 1010 may provide these features and/or any other features as may become available for smart speakers generally.

In some embodiments, smart speaker 1010 may couple with dynamic light display 1000 both physically and electronically. In some embodiments, smart speaker 1010 and dynamic light display 1000 may be housed in a single integrated housing unit. Otherwise, smart speaker 1010 and dynamic light display 1000 may comprise interfaces, both electronic and physical, which are adapted to couple together. In some embodiments, smart speaker 1010 and dynamic light display 1000 may be separate units coupled by a wired or wireless communication link.

In some embodiments, smart speaker 1010 may include at least one sensor to detect user direction. For example, in some embodiments, microphone array 1020 may detect user direction by detecting direction of incoming voice sounds. Microphone array 1020 may also optionally include vertically spaced microphones, which may optionally be positioned in or on the dynamic light display 1000 as shown, to detect user elevation relative to smart speaker 1000. Smart speaker 1010 may be adapted to control the dynamic light display 1000 to direct light toward the user direction and/or user elevation. For example, lights on a side of dynamic light display 1000 matching user direction/elevation may be activated by smart speaker 1010. Smart speaker 1010 may include an angular map of LED elements within dynamic light display 1000, and smart speaker 1010 may activate LED elements having a same angle as a detected user direction. Furthermore, smart speaker 1010 may for example activate upper LED elements within dynamic light display 1000 when a user elevation is above smart speaker 1010, or middle LED elements when a user elevation is on a similar level as smart speaker 1010, or lower LED elements when a user elevation is below smart speaker 1010. Smart speaker 1010 may also use personalized colors, light movements, etc., in response to different detected voice signatures. By directing light toward user direction and/or user elevation smart speaker 1010 may for example convey to the user and others near the smart speaker 1010 who smart speaker 1010 is listening to or speaking to. Or, smart speaker 1010 may simply display animations, etc. in the direction of a particular user or other target.

In some embodiments, smart speaker 1010 may be adapted to control the dynamic light display 1000 to direct light in a compass direction associated with a smart speaker interactive response. For example, if a user command is, "which direction is north?" the smart speaker 1010 may light up a northern side of the dynamic light display 1000. Smart speaker 1010 may include a compass for use with such features. It should be appreciated that smart speaker 1010 may control dynamic light display 1000 in order to produce a wide variety of useful functions, and this disclosure contemplates smart speaker 1010 uses of dynamic light display 1000 for any functions which may be developed.

While various embodiments have been disclosed herein, other aspects and embodiments will be apparent to those skilled in art.

The invention claimed is:

1. A dynamic light display, comprising:
a translucent case;
a controllable Light Emitting Diode (LED) array disposed inside the translucent case, wherein the controllable LED array comprises a plurality of individual LED elements, each individual LED element comprising at least one LED subpixel and a local controller; and
a dynamic light display controller electronically coupled to the controllable LED array, wherein:
the dynamic light display controller is configured to send control signals to the controllable LED array;
the control signals include intensity levels for each of the individual LED elements of the controllable LED array, wherein the local controllers receive the intensity levels and apply the intensity levels at the LED subpixels; and
the dynamic light display controller is configured to send the control signals in order to dynamically modify the intensity levels of the individual LED elements in the controllable LED array; wherein the controllable LED array is supported by a support structure comprising a rigid structure extending from a base platform, and wherein the controllable LED array comprises a plurality of LEDs affixed to an exterior surface of the support structure; and wherein the translucent case fits over the support structure and extends to the base platform to completely enclose the support structure, and the translucent case and the support structure are sized to leave an air gap between the translucent case and the support structure.

2. The dynamic light display of claim 1, wherein each individual LED element comprises a plurality of individually controllable and differently colored LED subpixels, and wherein the control signals comprise intensity levels for the plurality of individually controllable and differently colored LED subpixels.

3. The dynamic light display of claim 1, wherein:
support structure are at least partially cylindrical.

4. The dynamic light display of claim 3, wherein: the support structure comprises a rigid cylinder extending from the base platform; and the controllable LED array comprises a plurality of LED columns affixed to the exterior surface of the support structure; and the translucent case comprises a cylindrical sidewall with a dome top.

5. The dynamic light display of claim 1, wherein the translucent case is made of glass or acrylic.

6. The dynamic light display of claim 1, wherein a first resolution of the plurality of individual LED elements, along at least one first axis of the controllable LED array, includes at least 100 individual LED elements per meter, and wherein a second resolution of the plurality of individual LED elements, along at least one second axis of the controllable LED array, includes at least 50 individual LED elements per meter.

7. The dynamic light display of claim 1, wherein the dynamic light display controller is configured to send the control signals at a frame rate of 25-75 frames per second.

8. The dynamic light display of claim 1, wherein the dynamic light display controller is configured to send the control signals at a frame rate of 25-90 frames per second.

9. The dynamic light display of claim 1, wherein the dynamic light display controller dynamically modifies the intensity levels of the LED elements in the controllable LED array to produce one or more moving light shapes, wherein the one or more moving light shapes are characterized at least on part by a Gaussian intensity reduction at one or more edges of the moving light shapes.

10. The dynamic light display of claim 9, wherein the moving light shapes comprise moving light shapes of different colors.

11. The dynamic light display of claim 1, further comprising one or more sensors electronically coupled to the dynamic light display controller, and wherein the dynamic light display controller is configured to use sensor inputs to generate the control signals.

12. The dynamic light display of claim 1, further comprising a wireless communication link, wherein the dynamic light display controller is configured to use an input received via the wireless communication link to generate the control signals.

13. The dynamic light display of claim 1, further comprising a memory coupled to the dynamic light display controller, wherein the memory comprises a plurality of dynamic light display sequences, and wherein the dynamic light display controller is configured to play a dynamic light display sequence from the memory, in response to a user selection.

14. The dynamic light display of claim 13, wherein the memory is adapted to receive dynamic light display sequences from one or more external devices.

15. The dynamic light display of claim 14, wherein at least one of the one or more external devices is adapted to provide one or more user interfaces to compose custom dynamic light display sequences.

16. The dynamic light display of claim 1, further comprising a shadow stencil positioned between the controllable LED array and the translucent case.

17. The dynamic light display of claim 1, wherein the dynamic light display is coupled with a smart speaker.

18. The dynamic light display of claim 1, wherein the smart speaker includes at least one sensor to detect user direction and elevation, and wherein the smart speaker is adapted to control the dynamic light display to direct light toward the user direction and elevation.

19. The dynamic light display of claim 1, wherein the smart speaker is adapted to control the dynamic light display to direct light in a compass direction associated with a smart speaker interactive response.

* * * * *